W. CHALLINER.
WHEEL.
APPLICATION FILED AUG. 8, 1916.

1,209,261.

Patented Dec. 19, 1916.
3 SHEETS—SHEET 1.

INVENTOR.
Walter Challiner
by Herbert W. Jenner
Attorney

W. CHALLINER.
WHEEL.
APPLICATION FILED AUG. 8, 1916.
1,209,261.
Patented Dec. 19, 1916.
3 SHEETS—SHEET 2.
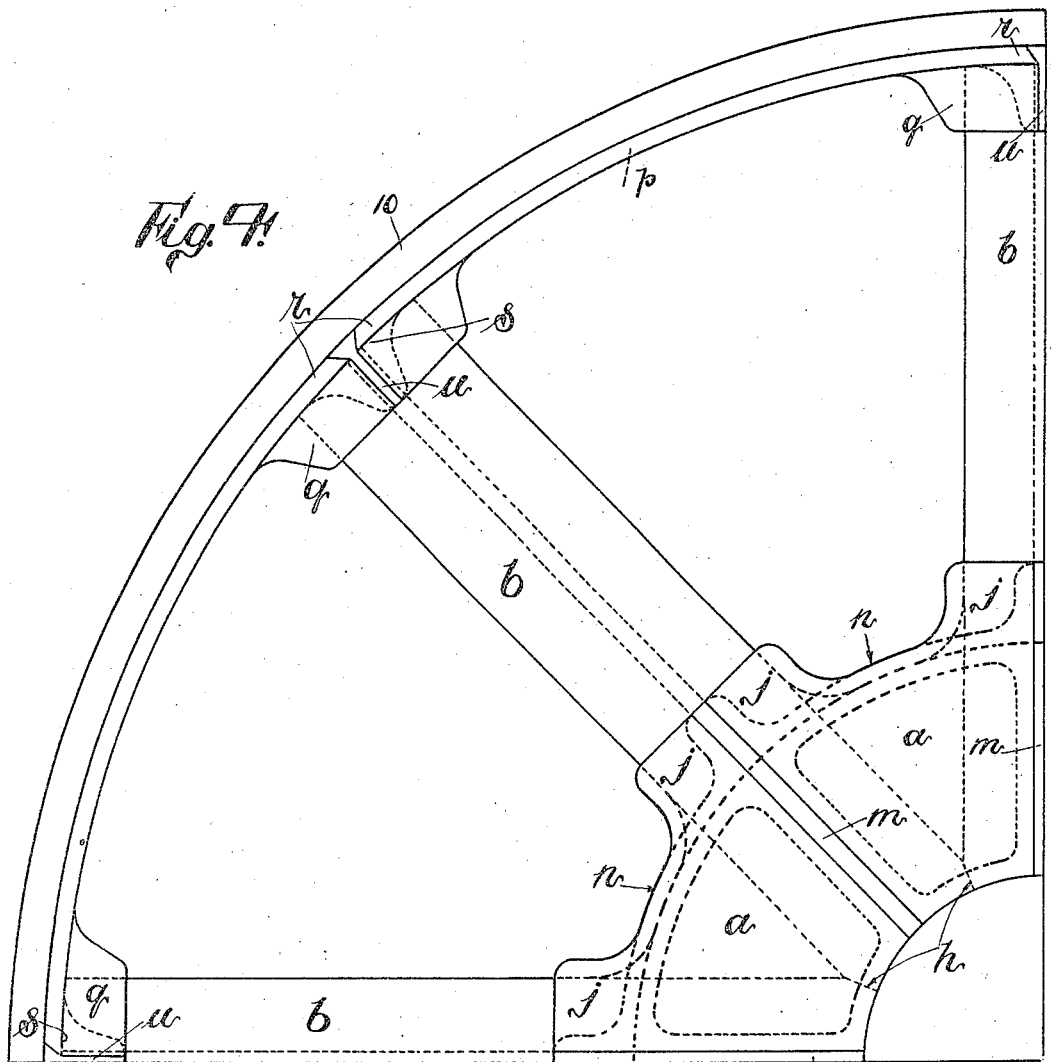
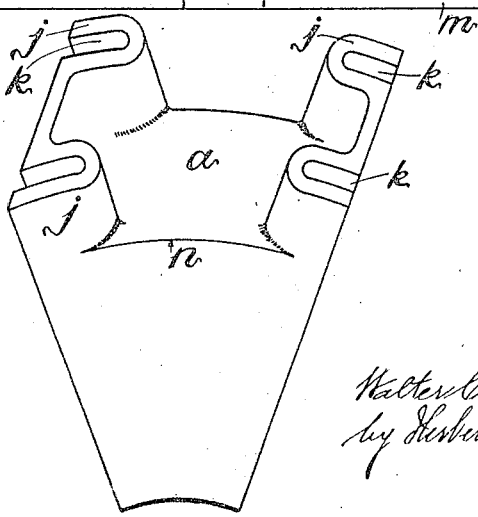
INVENTOR
Walter Challiner
by Herbert W. Jenner
Attorney

UNITED STATES PATENT OFFICE.

WALTER CHALLINER, OF LEVENSHULME, ENGLAND.

WHEEL.

1,209,261. Specification of Letters Patent. Patented Dec. 19, 1916.

Application filed August 8, 1916. Serial No. 113,782.

*To all whom it may concern:*

Be it known that I, WALTER CHALLINER, subject of the King of Great Britain and Ireland, and resident of Levenshulme, in the county of Lancaster, England, have invented certain Improvements in Wheels, of which the following is a specification.

My invention relates to improvements in the construction and manufacture of metal wheels for road vehicles and has reference to that type in which the wheel is built up in parts, that is to say, usually a hub portion a number of spokes and a rim, the object being to provide an improved construction and manufacture of wheels more particularly intended for the heavier class of road vehicle, though its usefulness is not limited thereto since the same construction may be adopted for the lighter type of wheels.

My invention comprises a novel construction of hub, means for connecting the spokes thereto, an improved construction of rim and means for connecting the latter to the outer ends of the spokes together with other details of construction which will be hereinafter referred to.

My invention will be fully described with reference to the accompanying drawings in which—

Figures 1, 2:
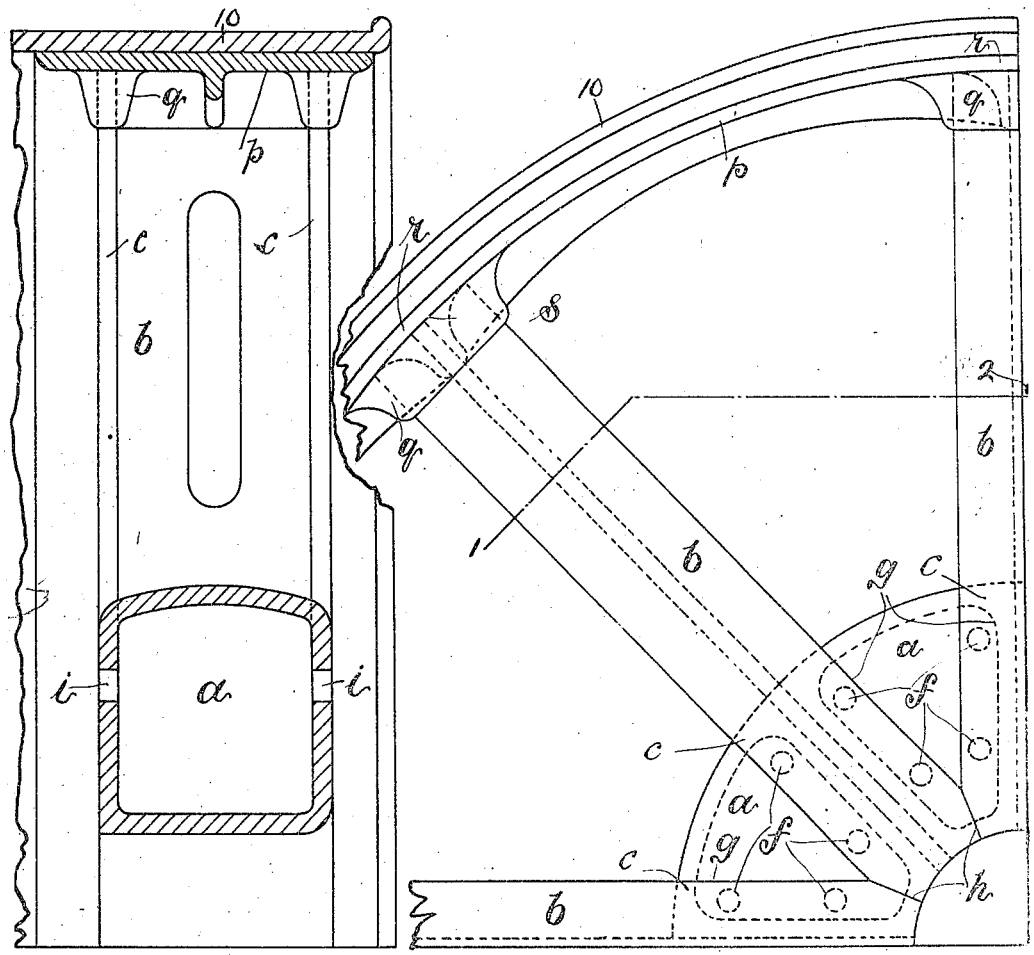
Figure 3:
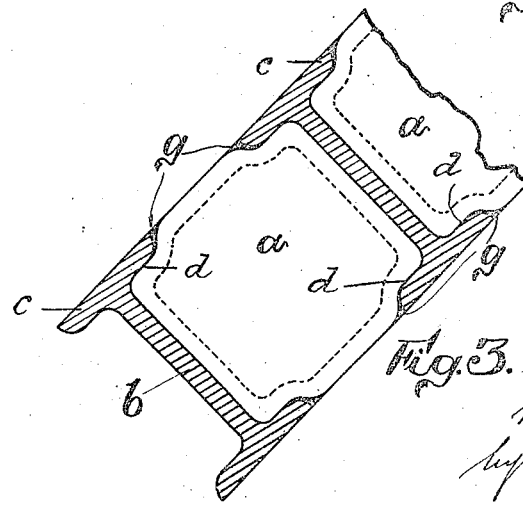
Figure 6:
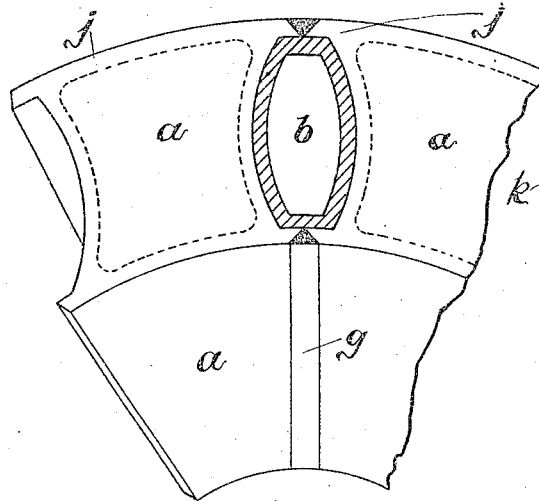
Figure 7:
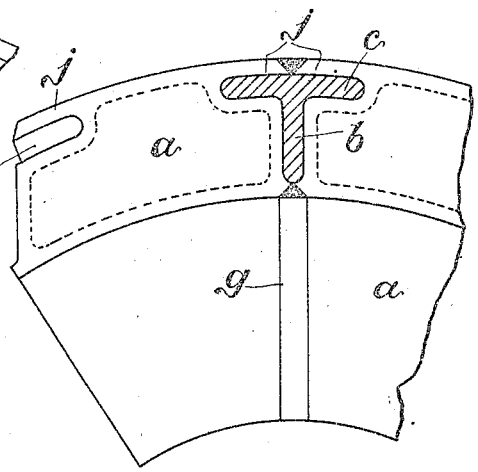
Figure 8:
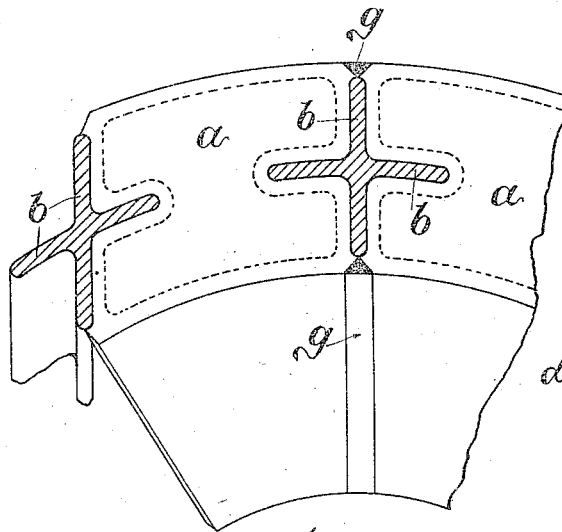
Figure 9:
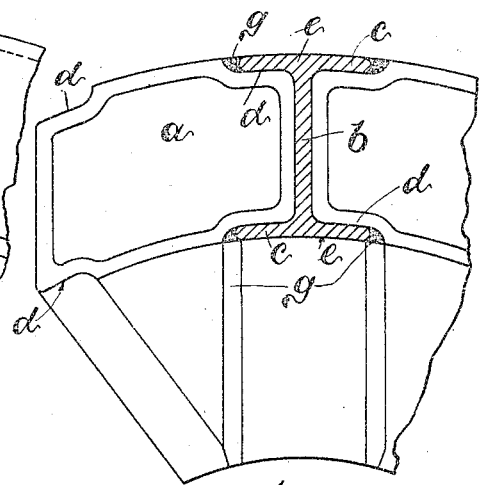

Figure 1 is a transverse section of half of a wheel constructed in accordance with my invention, Fig. 2 is a side elevation of a quarter of the wheel, Fig. 3 is a transverse section through two of the spokes on line 1, 1 of Fig. 2, Fig. 4 is a similar view to Fig. 2 of a modified construction of wheel, Fig. 5 is a perspective view of one of the hub blocks employed in Fig. 4, Fig. 6 is a perspective view showing a modified form of hub block arranged in connection with spokes of barrel-shaped cross section, Figs. 7 to 9 are perspective views of modified forms of hub blocks arranged in connection with spokes of different cross section.

In accordance with my invention I form the hub portion of the wheel in each of the constructions shown in the drawings from separate segmental or hollow blocks $a$ in conjunction with the inner ends of the spokes $b$. That is to say, I employ a number of hollow blocks $a$ which are roughly V-shaped in side elevation and of a segmental character, though I do not confine myself strictly to a segmental shape. The blocks are preferably hollow and fit between the inner ends of the spokes, the character of their joining faces with the spokes depending upon the cross section of the latter. Thus if the spokes are of girder section with the flanges $c$ forming the front and back edges or faces of the spokes or where such flanges lie in the front and back planes of the wheel as in Figs. 1 to 3 and Fig. 9, the hollow blocks are recessed at $d$ at their side faces so as to fit within the inner faces of the flanges $c$ and so that their extreme outer faces $e$ are flush with the outer faces of the flanges, though on the other hand the blocks may be made to fit between the inner faces of the flanges $c$ and may be welded to the latter where they join the spokes, that is to say, either at the edges of the latter or at the opposite faces of the spoke webs and radial side faces of the blocks, or they may be welded at several points through transverse holes $f$ made in the spoke flanges as shown in Fig. 2. Where the outer faces of the blocks are flush with the outer faces of the spoke flanges welding may be effected on the radial lines $g$ of the joints as shown in Fig. 3. The blocks shown in Figs. 1 to 3 are hollow boxes entirely inclosed on all sides and at the inner and outer ends. The spoke flanges $c$ are usually tapered or beveled off where they join together at $h$ as shown in Fig. 2 and the central hole of the hub formed by the blocks and spokes may be provided with a tubular sleeve (not shown) which may be removable or may be welded to the blocks and spokes, such sleeve receiving the usual axle sleeve as will be well understood, such latter sleeve being connected to the hub of the wheel by transverse bolts passed through holes $i$ shown in Fig. 1.

Fig. 9 shows blocks of a similar character to those already described except that the outer ends are not inclosed. Welding is carried out on the radial lines $g$ as already described.

In another form of block it may be provided with outer flanges $j$, Figs. 4 and 5, adapted to overlap the flanges $c$ of the girder spokes, or in other words each block would be recessed at $k$ on its converging sides to fit on the flanges of the spokes, the outer edges of the block flanges being beveled off or left square as shown in Fig. 5 and stopped short of each other so as to leave a space $m$ Fig. 4 between their joining edges when the whole of them are assembled. Or where the edges are beveled off V-shaped spaces are left but in both cases the edges do not touch thereby leaving the outer faces of the spoke flanges exposed to allow of welding taking place along the radial spaces $m$ and so as to form a homogeneous connection during welding between the blocks and the spokes. The outer end of the blocks may stop off on the concentric line $n$ Fig. 5 or the recessed embracing portions of the blocks may be extended radially beyond the line $n$ as shown in Figs. 4 and 5.

In Fig. 6 a modification of the arrangement just described is indicated, the blocks being altered in construction to suit the cross section of the barrel-shaped spoke indicated.

Fig. 7 indicates blocks adapted to the cross section of T-shaped spokes, the plane faces of the blocks having extending flanges to embrace the flange $c$ and also the web of the spoke. The construction will be well understood from the description given of the other modifications previously referred to.

Fig. 8 indicates another modified form of block adapted to spokes of the section indicated in the figure, welding taking place along the edges of the front and back webs while the inner webs are embraced by the recessed portions of the blocks.

I do not confine myself to any particular cross section of the spokes but as will have been gathered from the foregoing description spokes of varying cross sections may be employed and the blocks be altered to correspond but generally the blocks and spokes would be connected together substantially in the manner previously described.

My invention also relates to improved constructions of rim for the wheels and consists in one case of making the rim from a number of segments $p$ as shown in Fig. 4. The rim segments $p$ are provided with inwardly projecting half sockets $q$, shaped to receive the outer end portions of the spokes. The extreme ends of the spokes $s$ are arranged to abut against the bottoms $r$ of these sockets, and the end portions of the spokes are welded to the edges of the half sockets at the radial openings $u$ normally formed between the edges of the half sockets. The rim segments are welded together at the half sockets, and the tire 10 may be formed separately and secured upon the segments $p$, or it may be formed integral with them.

What I claim is:

1. A metallic wheel, comprising radial spokes the inner ends of which extend to the central opening of the hub, and suitably shaped hollow hub-blocks arranged circumferentially in and filling the angular spaces between the inner end portions of the said spokes, said blocks being welded directly to the said spokes.

2. A metallic wheel, comprising radial spokes provided with longitudinal flanges and having their inner ends arranged to extend to the central opening of the hub, and hollow hub-blocks provided with recesses for engaging the spoke flanges, said blocks being arranged circumferentially in and filling the angular spaces between the inner end portions of the said spokes and being welded directly to them.

3. A metallic wheel, comprising radial spokes, and a rim formed of rim sections which are welded together and provided with half sockets which fit around the outer end portions of the said spokes, the outer ends of the spokes being arranged to abut against the bottoms of the sockets, and the side portions of the spokes being welded directly to the edges of the half sockets at the radial openings between them.

In testimony whereof I have hereunto set my hand in the presence of two witnesses.

WALTER CHALLINER.

Witnesses:
WILLIAM H. TAYLOR,
AMY EVELINE EVINS.